US010714756B2

(12) United States Patent
Dai et al.

(10) Patent No.: US 10,714,756 B2
(45) Date of Patent: Jul. 14, 2020

(54) METAL DEPOSITION METHODS FOR FORMING BIMETALLIC STRUCTURES, BATTERIES INCORPORATING BIPOLAR CURRENT COLLECTORS MADE THEREFROM, AND APPLICATIONS THEREOF

(71) Applicant: GM Global Technology Operations LLC, Detroit, MI (US)

(72) Inventors: Fang Dai, Troy, MI (US); Mahmoud H. Abd Elhamid, Troy, MI (US); Anne M. Dailly, West Bloomfield, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 382 days.

(21) Appl. No.: 15/349,341

(22) Filed: Nov. 11, 2016

(65) Prior Publication Data
US 2018/0138513 A1    May 17, 2018

(51) Int. Cl.
*H01M 10/052* (2010.01)
*H01M 4/66* (2006.01)
(Continued)

(52) U.S. Cl.
CPC ......... *H01M 4/661* (2013.01); *C23C 18/1651* (2013.01); *C23C 18/1653* (2013.01);
(Continued)

(58) Field of Classification Search
CPC ................ H01M 10/052; H01M 10/0525
See application file for complete search history.

(56) References Cited

U.S. PATENT DOCUMENTS

| 3,936,548 A | 2/1976 | Konicek |
| 5,518,839 A * | 5/1996 | Olsen ............... H01M 4/661 |
| | | 429/231.3 |

(Continued)

FOREIGN PATENT DOCUMENTS

| CN | 1230872 A | 10/1999 |
| CN | 1732582 A | 2/2006 |

(Continued)

OTHER PUBLICATIONS

Banerjee et al. (Nano Energy (2013) 2, 1158-1163).*
(Continued)

*Primary Examiner* — Olatunji A Godo
(74) *Attorney, Agent, or Firm* — Harness, Dickey & Pierce, P.L.C.

(57) ABSTRACT

In certain aspects, electrolytic deposition and electroless displacement deposition methods are provided to form bimetallic structures that may be used as a bipolar current collector in a battery or a substrate for forming graphene sheets. In other aspects, bipolar current collectors for lithium-ion based electrochemical cells are provided. The bimetallic current collector may have an aluminum-containing surface and a continuous copper coating. In other aspects, a flexible substrate may be coated with one or more conductive materials, like nickel, copper, graphene, aluminum, alloys, and combinations thereof. The flexible substrate is folded to form a bipolar current collector. New stack assemblies for lithium-ion based batteries incorporating such bipolar current collectors are also provided that can have cells with a tab-free and/or weld-free design.

11 Claims, 8 Drawing Sheets

(51) Int. Cl.
    *C25D 3/38*     (2006.01)
    *C25D 3/12*     (2006.01)
    *C23C 18/16*     (2006.01)
    *C25D 5/44*     (2006.01)
    *C25D 3/40*     (2006.01)
    *C23C 18/54*     (2006.01)

(52) U.S. Cl.
    CPC ............... *C23C 18/54* (2013.01); *C25D 3/12* (2013.01); *C25D 3/38* (2013.01); *C25D 3/40* (2013.01); *C25D 5/44* (2013.01); *H01M 4/667* (2013.01)

(56) References Cited

U.S. PATENT DOCUMENTS

| | | | | |
|---|---|---|---|---|
| 6,426,161 | B1* | 7/2002 | Cisar | H01M 8/0206 429/210 |
| 2011/0045349 | A1* | 2/2011 | Pushparaj | H01G 9/0029 429/212 |
| 2011/0177370 | A1* | 7/2011 | Kawamoto | H01M 4/667 429/94 |
| 2013/0189565 | A1* | 7/2013 | Lashmore | H01M 4/366 429/163 |
| 2014/0045061 | A1* | 2/2014 | Suzuki | C25D 3/58 429/211 |
| 2014/0272558 | A1 | 9/2014 | Xiao et al. | |
| 2016/0181594 | A1 | 6/2016 | Balogh et al. | |

FOREIGN PATENT DOCUMENTS

| | | |
|---|---|---|
| CN | 101312245 A | 11/2008 |
| CN | 101740799 A | 6/2010 |
| CN | 103579632 A | 2/2014 |
| CN | 103752842 A | 4/2014 |
| CN | 103545530 B | 4/2016 |
| CN | 108075089 A | 5/2018 |
| DE | 102017126265 A1 | 5/2018 |
| JP | 2007188746 A | 7/2007 |

OTHER PUBLICATIONS

Yoshiyuki Gambe et al.; "Development of Bipolar All-solid-state Lithium Battery Based on Quasi-solid-state Electrolyte Containing Tetrglyme-LiTFSA Equimolar Complex"; Scientific Reports; Mar. 9, 2015; 4 pages.

First Office Action in Chinese Patent Application No. 201711091883.1 dated Apr. 3, 2020 with English language machine translation, 17 pages.

* cited by examiner

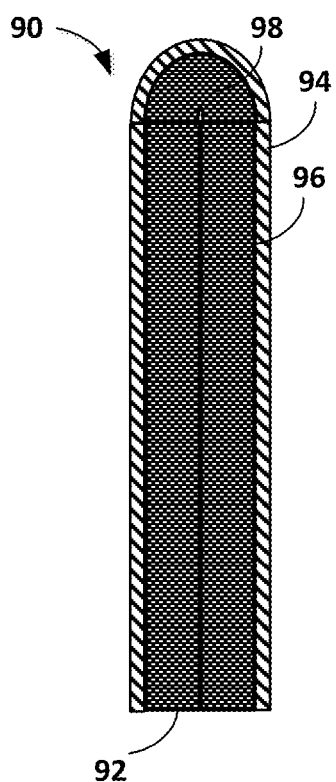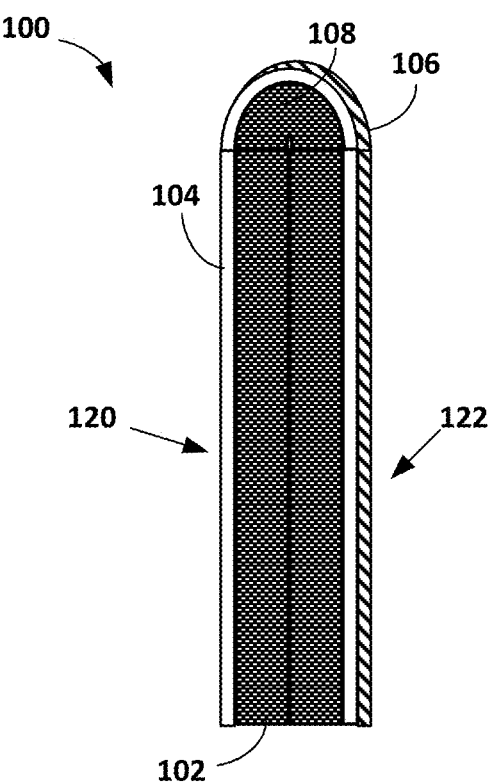
FIG. 4     FIG. 6
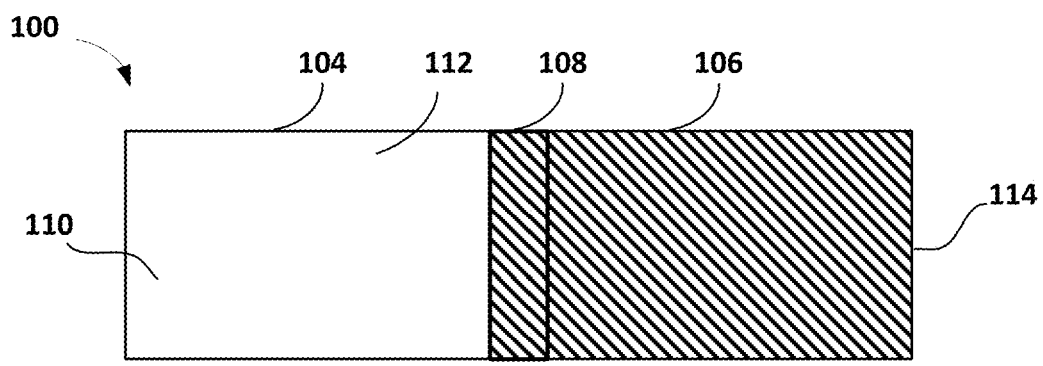
FIG. 5

METAL DEPOSITION METHODS FOR FORMING BIMETALLIC STRUCTURES, BATTERIES INCORPORATING BIPOLAR CURRENT COLLECTORS MADE THEREFROM, AND APPLICATIONS THEREOF

FIELD

The present disclosure relates to bipolar films or sheets, including bimetallic current collectors for batteries, and methods of forming such bipolar current collectors, including metal deposition techniques therefore.

BACKGROUND

This section provides background information related to the present disclosure which is not necessarily prior art.

High-energy density electrochemical cells, like lithium ion batteries, can be used in a variety of applications, including for consumer products, like electronics, power tools, lawn and garden equipment, motorized wheelchairs, toys, and for transportation. An exemplary use in transportation includes vehicles, such as Hybrid Electric Vehicles (HEVs) and Electric Vehicles (EVs). Typical lithium ion batteries comprise a first electrode (e.g., a positive electrode or cathode), a second electrode (e.g., a negative electrode or anode), an electrolyte material, and a separator. Often a stack of lithium ion battery cells is electrically connected to increase overall output. Conventional lithium ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery. For convenience, a negative electrode will be used synonymously with an anode, although as recognized by those of skill in the art, during certain phases of lithium ion cycling, the anode function may be associated with the positive electrode rather than the negative electrode (e.g., the negative electrode may be an anode on discharge and a cathode on charge). Likewise, a positive electrode will be used synonymously with a cathode, although the same is true.

Contact of the anode and cathode materials with the electrolyte can create an electrical potential between the electrodes. When electron current is generated in an external circuit between the electrodes, the potential is sustained by electrochemical reactions within the cells of the battery. Each of the negative and positive electrodes within a stack is connected to a current collector (formed of a metal, such as copper or nickel for the anode and aluminum for the cathode). The stack also has a first and second terminal end plate that is disposed adjacent to a terminal electrode on each terminal end. Each current collector within the stack typically has an electrically conductive tab that extends therefrom. Where there are multiple positive and negative current collectors in a stack, the positive current collector tabs are connected together in parallel and the negative current collector tabs are likewise connected together in parallel. The plurality of tabs is typically welded together, for example, by ultrasonic welding. During battery usage, the current collectors associated with each electrode are connected by an external circuit that allows current generated by electrons to pass between the electrodes to compensate for transport of lithium ions. However, over time, the welded current collector tabs can be weakened through thermal or volumetric cycling during battery use.

Thus, it would be desirable to enhance the robustness of a stack of battery cells for long-term use by potentially eliminating multiple current collector tabs for each current collector. Further, it would be desirable to increase the specific energy and energy density (charge capacity per unit volume and mass) of the battery, such as high power lithium ion batteries, by reducing the weight of various current collector components and improving battery performance.

SUMMARY

This section provides a general summary of the disclosure, and is not a comprehensive disclosure of its full scope or all of its features.

In certain aspects, the present disclosure contemplates a method of forming a bimetallic structure, for example, a film or sheet. The bimetallic structure may be used as a bipolar current collector in a battery. The method may include depositing an electrically conductive metal on a surface of a substrate to form a continuous metal coating. The method may include depositing an electrically conductive metal on a surface including aluminum to form a continuous metal coating by a process selected from the group consisting of: electrolytic deposition, electroless displacement deposition, and combinations thereof. The electrically conductive metal may be selected from the group consisting of: copper, nickel, and combinations thereof. In this manner, a bimetallic current collector having an average thickness of less than or equal to about 25 micrometers is formed.

The method may further include the surface including aluminum is on a substrate selected from the group consisting of: plastic, graphene, aluminum foil, and combinations thereof.

The method may further include the surface including aluminum is an aluminum foil substrate.

The method may further include an electrolytic deposition process carried out in a liquid medium including water and either (i) a copper-containing compound selected from the group consisting of: copper sulfates, copper chlorites, copper cyanide, copper tetraethylenepetamine, ammoniacal copper sulfate, copper pyrophosphate, ammoniacal copper chloride, ammoniacal copper benzenetricarboxylate MOF (Cu-BTC) solution, ammoniacal NOTT-116 solution, ammoniacal copper NOTT-100 solution, ammoniacal copper MOF74 solution, and combinations thereof, or (ii) a nickel-containing compound selected from the group consisting of: nickel sulfate, nickel chloride, nickel fluoroborate, and combinations thereof. The copper-containing compound may be present in the liquid medium at greater than or equal to about 40 to less than or equal to about 250 g/L or the nickel-containing compound may be present in the liquid medium at greater than or equal to about 150 g/L to less than or equal to about 300 g/L. The electrolytic deposition is optionally carried out at a current density of greater than or equal to about 0.005 A/cm$^2$ to less than or equal to about 0.5 A/cm$^2$ and a temperature of the liquid medium is optionally greater than or equal to about 20° C. to less than or equal to about 60° C.

The method may further include forming a pretreatment layer including zinc by reacting the aluminum on the surface with a zincate.

The method may further include an electroless displacement deposition process carried out in a medium including a chelate. The chelate may include a copper metal organic framework (Cu-MOF). In other aspects, the chelate is selected from the group consisting of: ammoniacal copper benzenetricarboxylate MOF (Cu-BTC) solution, ammoniacal NOTT-116 solution, ammoniacal copper NOTT-100 solution, ammoniacal copper MOF74 solution, ammoniacal solution of cupric chloride, ammoniacal solutions of copper sulfate, and combinations thereof.

The method may also forming a continuous metal coating that is a copper coating having a thickness of greater than or equal to about 2 monolayers and less than or equal to about 1 micrometer.

The method may also further include depositing graphene over the continuous metal coating.

In other aspects, the present disclosure contemplates a method of forming a bipolar current collector for a battery. The method may include depositing a conductive material selected from the group consisting of: copper, nickel, aluminum, graphene, alloys, and combinations thereof on a first surface of a flexible substrate. Then, the flexible substrate may be folded so that the first surface is exposed and defines a first side, a folded region, and a second side. The first side defines a first current collector having a first polarity and the second side defines a second current collector having a second polarity opposite to the first polarity so as to form a bipolar current collector.

The method may further include depositing a first material selected from the group consisting of: nickel, copper, graphene, alloys, and combinations thereof on a first portion of the first surface to form a first coating and depositing a second material distinct from the first material selected from the group consisting of: nickel, copper, graphene, alloys, and combinations thereof on a second portion of the first surface to form a second coating. The first portion and the second portion are distinct regions of the first surface so that the first coating defines the first side and the second coating defines the second side after the folding.

The method may further include the flexible substrate being selected from the group consisting of: plastic, graphene, aluminum foil, and combinations thereof.

The method may further include the conductive material including nickel or copper. The depositing process may be selected from the group consisting of: electrolytic deposition, electroless displacement deposition, and combinations thereof to form a coating of the material having an average thickness of less than or equal to about 25 micrometers.

In yet other aspects, the present disclosure contemplates a stack assembly for a lithium-ion battery. The battery may include a first electrode having a first polarity and a second electrode having a second polarity opposite to the first polarity. The battery also includes a first separator disposed between the first electrode and the second electrode. The first electrode, the second electrode, and the first separator define a first cell having electrolyte disposed therein. A bipolar current collector having a first side and a second side opposite to the first side is also provided in the stack assembly. The bipolar current collector has an average thickness of less than or equal to about 25 micrometers. The first side is disposed adjacent to the first electrode and in electrical communication therewith.

The stack assembly may further include a first terminal end plate having a first tab disposed at a first terminal end of the stack and a second terminal end plate having a second tab disposed at a second terminal end of the stack. The first cell is disposed between the first terminal end plate and the second terminal end plate and the first cell is tab-free and weld-free.

The stack assembly may further include the first side of the bipolar current collector having a continuous coating including a material selected from the group consisting of: nickel, copper, alloys, and combinations thereof and the second side of the bipolar current collector including an aluminum-containing material.

The stack assembly may further include the bipolar current collector including a folded flexible substrate selected from the group consisting of: plastic, graphene, aluminum foil, and combinations thereof. An exposed surface of the folded flexible substrate comprises a material selected from the group consisting of: nickel, copper, graphene, aluminum, alloys, and combinations thereof.

The stack assembly may further include an exposed surface of the folded flexible substrate that defines the first side and the second side. The material may be a first material disposed on the first side. The first material is optionally selected from the group consisting of: nickel, copper, graphene, aluminum, alloys, and combinations thereof. The second side includes a second material distinct from the first material selected from the group consisting of: nickel, copper, graphene, aluminum alloys, and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 shows a side view of a bipolar current collector having a flexible substrate and an electrically conductive material coating prepared in accordance with certain aspects of the present disclosure.

FIG. 5 shows a plan view of a bipolar current collector having two distinct electrically conductive material coatings prepared in accordance with certain aspects of the present disclosure.

FIG. 6 shows a side view of a bipolar current collector having a flexible substrate and two distinct electrically conductive material coatings prepared in accordance with certain aspects of the present disclosure.

Corresponding reference numerals indicate corresponding parts throughout the several views of the drawings.

DETAILED DESCRIPTION

Figure 1:
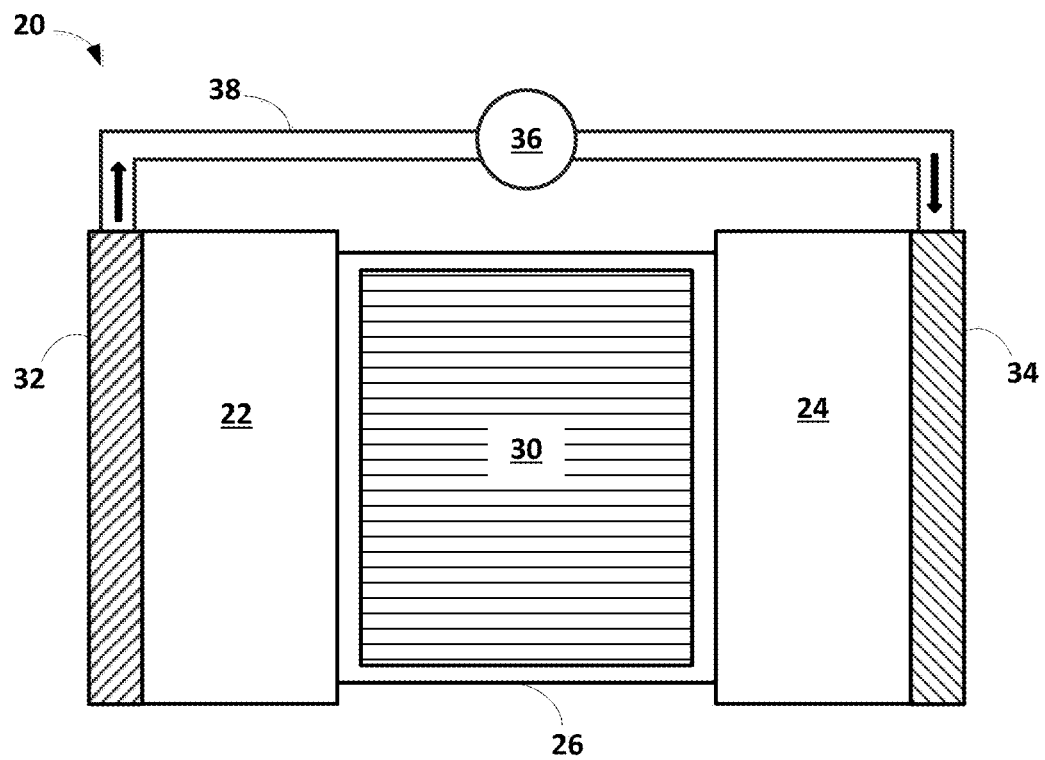
FIG. 1 is a schematic of an exemplary electrochemical battery cell for purposes of illustration.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

As used herein, the terms "composition" and "material" are used interchangeably to refer broadly to a substance containing at least the preferred chemical compound, but which may also comprise additional substances or compounds, including impurities.

Example embodiments will now be described more fully with reference to the accompanying drawings.

The present technology pertains to improved electrochemical cells, especially lithium ion batteries, which may be used in vehicle applications. By way of background, an exemplary and schematic illustration of a single cell lithium ion battery 20 is shown in FIG. 1. An exemplary and schematic illustration of a lithium ion battery 20 is shown in FIG. 1. Lithium ion battery 20 includes a negative electrode 22, a positive electrode 24, and a separator 26 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24 so that they are in electrical communication. The negative electrode current collector 32 and positive electrode current collector 34 respectively collect and move free electrons to and from an external circuit 36. An interruptible external circuit 36 and load 38 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the lithium ion battery 20.

The lithium ion battery 20 can generate an electric current during discharge by way of reversible electrochemical reactions that occur when the external circuit 36 is closed (to connect the negative electrode 22 and the positive electrode 24) and the negative electrode 22 contains a relatively greater quantity of intercalated lithium. The chemical potential difference between the positive electrode 24 and the negative electrode 22 drives electrons produced by the oxidation of intercalated lithium at the negative electrode 22 through the external circuit 36 toward the positive electrode 24. Lithium ions, which are also produced at the negative electrode 22, are concurrently transferred through the electrolyte 30 and separator 26 towards the positive electrode 24. The electrons flow through the external circuit 36 and the lithium ions migrate across the separator 26 in the electrolyte 30 to form intercalated lithium at the positive electrode 24. The electric current passing through the external circuit 18 can be harnessed and directed through the load device 38 until the intercalated lithium in the negative electrode 22 is depleted and the capacity of the lithium ion battery 20 is diminished.

The lithium ion battery 20 can be charged or re-powered at any time by connecting an external power source to the lithium ion battery 20 to reverse the electrochemical reactions that occur during battery discharge. The connection of an external power source to the lithium ion battery 20 facilitates the otherwise non-spontaneous oxidation of intercalated lithium at the positive electrode 24 to produce electrons and lithium ions. The electrons, which flow back towards the negative electrode 22 through the external circuit 36, and the lithium ions, which are carried by the electrolyte 30 across the separator 26 back towards the negative electrode 22, reunite at the negative electrode 22 and replenish it with intercalated lithium for consumption during the next battery discharge cycle. The external power source that may be used to charge the lithium ion battery 20 may vary depending on the size, construction, and particular end-use of the lithium ion battery 20. Some notable and exemplary external power sources include, but are not limited to, an AC wall outlet and a motor vehicle alternator. In many lithium ion battery configurations, each of the negative current collector 32, negative electrode 22, the separator 26, positive electrode 24, and positive current collector 34 are prepared as relatively thin layers (for example, several microns or a millimeter or less in thickness) and assembled in layers as distinct cells of a stack connected in electrical parallel arrangement (via connection to external tabs connected to each respective current collector) to provide a suitable energy package.

Any appropriate electrolyte 30, whether in solid form or solution, capable of conducting lithium ions between the negative electrode 22 and the positive electrode 24 may be used in the lithium ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium ion battery 20. A non-limiting list of lithium salts that may be dissolved in an organic solvent to form the non-aqueous liquid electrolyte solution include $LiPF_6$, $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, and combinations thereof. These and other similar lithium salts may be dissolved in a variety of organic solvents, including but not limited to various alkyl carbonates, such as cyclic carbonates (ethylene carbonate (EC), propylene carbonate (PC), butylene carbonate (BC)), acyclic carbonates (dimethyl carbonate (DMC), diethyl carbonate (DEC), ethylmethylcarbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The separator 26 may include, in one embodiment, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 26 is a microporous polymeric separator, it may be a single layer or a multi-layer laminate, which may be fabricated from either a dry or a wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also comprise other polymers in addition to the polyolefin such as, but not limited to, polyethylene terephthalate (PET), polyvinylidene fluoride (PVDF), and/or a polyamide. The polyolefin layer, and any other optional polymer layers, may further be included in the microporous polymer separator 26 as a fibrous layer to help provide the microporous polymer separator 26 with appropriate structural and porosity characteristics. Various conventionally available polymers and commercial products for forming the separator 26 are contemplated, as well as the many manufacturing methods that may be employed to produce such a microporous polymer separator 26.

The positive electrode 24 may be formed from any lithium-based active material that can sufficiently undergo lithium intercalation and deintercalation, while functioning as the positive terminal of the lithium ion battery 20. The positive electrode 24 may include a polymeric binder material to structurally fortify the lithium-based active material. The positive electrode 24 may also include electrically conductive materials or particles, such as carbon black or graphite, which can be added to improve electron transport.

One exemplary common class of known active materials that can be used to form the positive electrode 24 is layered lithium transitional metal oxides. For example, the positive electrode 24 may comprise at least one spinel, like lithium manganese oxide ($Li_{(1+x)}Mn_{(2-x)}O_4$), where $0 \le x \le 1$, where x is typically less than 0.15, including $LiMn_2O_4$, lithium manganese nickel oxide, ($LiMn_{(2-x)}Ni_xO_4$), where $0 \le x \le 1$, e.g., $LiMn_{1.5}Ni_{0.5}O_4$, lithium cobalt oxide ($LiCoO_2$), lithium manganese oxide ($LiMn_2O_4$), lithium nickel oxide ($LiNiO_2$), a lithium nickel manganese cobalt oxide (Li($Ni_xMn_yCo_z$)$O_2$), where $0 \le x \le 1.0, y \le 1, 0 \le z \le 1$, and $x+y+z=1$, a lithium nickel cobalt metal oxide $LiNi_{(1-x-y)}Co_xM_yO_2$ (wherein $0<x<1, y<1$, and M may be Al, Mn, or the like), lithium-transition metal oxides or mixed oxides lithium iron phosphates, or a lithium iron polyanion oxide such as lithium metal phosphates (e.g., $LiFePO_4$) or lithium metal fluorophosphates (e.g., $Li_2FePO_4F$). A variety of other known lithium-based active materials may also be used. By way of non-limiting example, alternative active materials may include lithium nickel oxide ($LiNiO_2$), lithium aluminum manganese oxide ($Li_xAl_yMn_{(1-y)}O_2$), and lithium vanadium oxide ($LiV_2O_5$). In certain variations, the positive electrode 24 comprises at least one of spinel, such as lithium manganese oxide ($Li_{(1+x)}Mn_{(2-x)}O_4$), lithium manganese nickel oxide, ($LiMn_{(2-x)}Ni_xO_4$), where $0 \le x \le 1$, lithium manganese nickel cobalt oxide, (e.g., $LiMn_{1/3}Ni_{1/3}Co_{1/3}O_2$), or lithium iron phosphate ($LiFePO_6$). Such active materials may be intermingled with at least one polymeric binder, for example, by slurry casting the electroactive materials with such binders, like polyvinylidene fluoride (PVDF), ethylene propylene diene monomer (EPDM) rubber, or carboxymethoxyl cellulose (CMC). The positive current collector 34 may be formed from aluminum, graphene, nickel, or any other appropriate electrically conductive material known to those of skill in the art. The positive current collector 34 can be connected to an external current collector tab.

In various aspects, the negative electrode 22 includes an electroactive material as a lithium host material capable of functioning as a negative terminal of a lithium ion battery. The negative electrode 22 may also include another electrically conductive material, as well as one or more polymeric binder materials to structurally hold the lithium host material together. For example, in certain embodiments, the negative electrode 22 may comprise graphite, lithium titanate oxide $Li_4Ti_5O_{12}$ (LTO), silicon, silicon-containing alloys, tin-containing alloys, and combinations thereof.

Graphite is often used to form the negative electrode 22 because it exhibits advantageous lithium intercalation and deintercalation characteristics, is relatively non-reactive in the electrochemical cell environment, and can store lithium in quantities that provide a relatively high energy density. Commercial forms of graphite and other graphene materials that may be used to fabricate the negative electrode 22 are available from, by way of non-limiting example, Timcal Graphite and Carbon of Bodio, Switzerland, Lonza Group of Basel, Switzerland, or Superior Graphite of Chicago, United States of America. Other materials can also be used to form the negative electrode 22, including, for example, lithium-silicon and silicon containing binary and ternary alloys and/or tin-containing alloys, such as Si—Sn, SiSnFe, SiSnAl, SiFeCo, $SnO_2$, and the like. In certain alternative embodiments, lithium-titanium anode materials are contemplated, such as $Li_{4+x}Ti_5O_{12}$, where $0 \le x \le 3$, including lithium titanate ($Li_4Ti_5O_{12}$) (LTO). Any of these negative electroactive materials may of course be combined with other electroactive materials.

Negative electrodes may comprise greater than or equal to about 50% to less than or equal to about 90% of an electroactive material (e.g., graphite particles), optionally greater than or equal to about 5% to less than or equal to about 30% of an electrically conductive material, and a balance binder. Suitable electroactive materials include those discussed previously above and may be the same as the electrically conductive materials, such as graphite. Electrically conductive materials also include carbon black, powdered nickel, metal particles, conductive polymers, or any combinations thereof. Useful binders may comprise a polymeric material and extractable plasticizer suitable for forming a bound porous composite, such as halogenated hydrocarbon polymers (such as poly(vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

The negative electrode current collector 32 may be formed from copper, graphite, nickel, or any other appropriate electrically conductive material known to those of skill in the art. The negative electrode current collector 32 may be a metal foil, which may be in the form of an open mesh grid or a thin film. The current collector can be connected to an external current collector tab.

A battery may thus be assembled in a laminated cell structure, comprising an anode layer, a cathode layer, and electrolyte/separator between the anode and cathode layers. The anode and cathode layers each comprise an adjacent current collector with which they are respectively in electrical communication.

For example, in certain variations, an electrode membrane, such as an anode membrane, comprises the electrode active material (e.g., graphite) dispersed in a polymeric binder matrix over a current collector. The separator can then be positioned over the negative electrode element, which is covered with a positive electrode membrane comprising a composition of a finely divided lithium insertion compound in a polymeric binder matrix. A positive current collector, such as aluminum collector foil or grid completes the assembly. Tabs of the current collector elements form respective terminals for the battery. A protective enclosure covers the cell and prevents infiltration of air and moisture. Into this enclosure, an electrolyte is injected into the separator (and may also be imbibed into the positive and/or negative electrodes) suitable for lithium ion transport. In certain aspects, the laminated battery is further hermetically sealed prior to use.

With renewed reference to FIG. 1, the lithium ion battery 20 can include a variety of other components that while not depicted here are nonetheless known to those of skill in the art. For instance, the lithium ion battery 20 may include a casing, gaskets, terminal end plates, terminal caps, and any other conventional components or materials that may be situated within the battery 20, including between or around the negative electrode 22, the positive electrode 24, and/or the separator 26, by way of non-limiting example.

The lithium ion battery 20 can generate electric current to a load device 38 that can be operatively connected to the external circuit 36. The load device 38 may be powered fully or partially by the electric current passing through the external circuit 36 when the lithium ion battery 20 is discharging. As noted above, the size and shape of the lithium ion battery 20 may vary depending on the particular application for which it is designed. Battery-powered vehicles and hand-held consumer electronic devices, for example, are two examples where the lithium ion battery 20 would most likely be designed to different size, capacity, and power-output specifications. While the load device 38 may be any number of known electrically powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 38 may also be a power-generating apparatus that charges the lithium ion battery 20 for purposes of storing energy.

Figure 2:
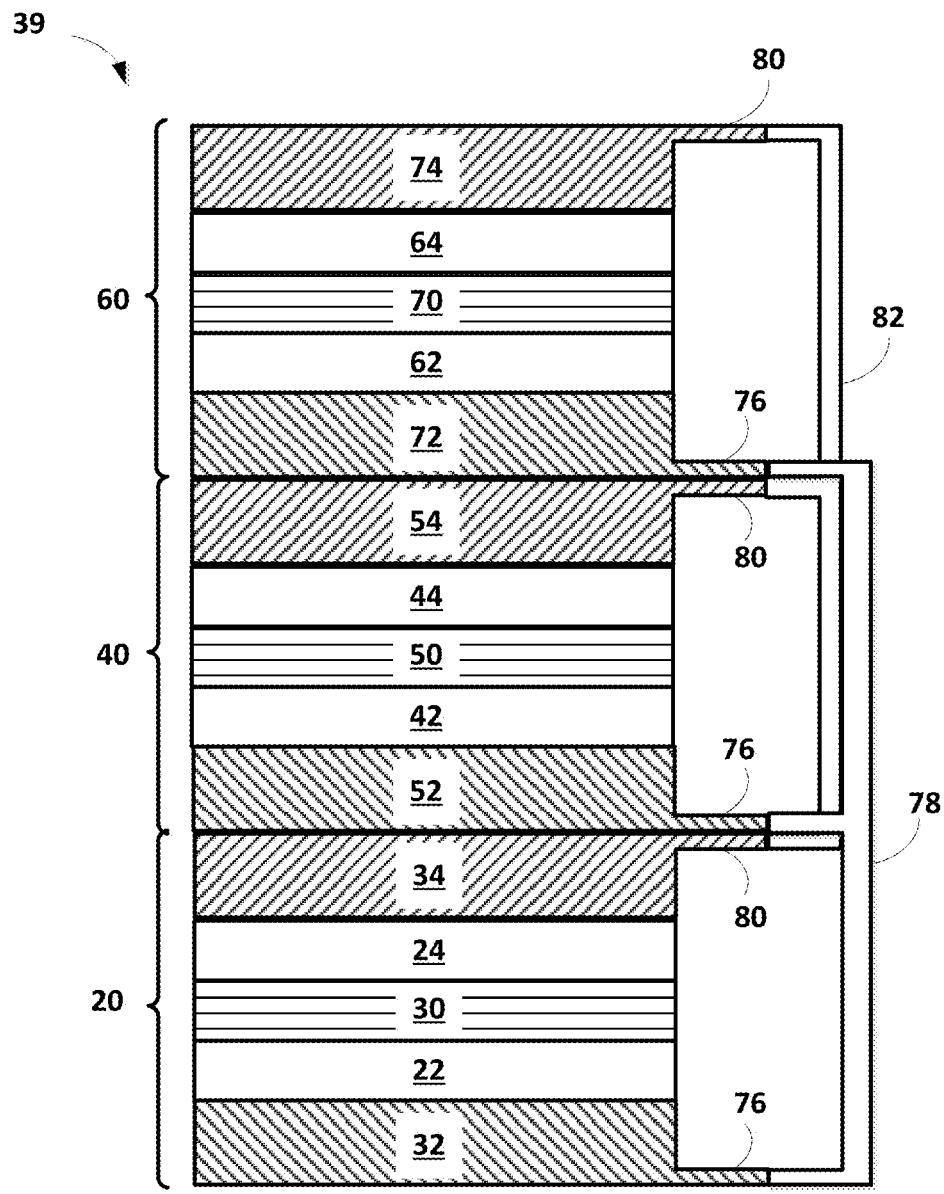
FIG. 2 shows an exemplary stack assembly of a plurality of battery cells.

The lithium ion battery 20 may also be connected in series or parallel with other similar lithium ion cells or batteries to produce a greater voltage output and power density if it is required by the load device 38. By way of example in FIG. 2, a battery stack assembly 39 is shown that incorporates the lithium ion battery 20 as a first cell or layer that includes the negative current collector 32, negative electrode 22, the separator 26, positive electrode 24, and positive current collector 34. The stack assembly 39 further includes an adjacent second cell 40 that includes each of a second negative current collector 52, a second negative electrode 42, a second separator 46, a second positive electrode 44, and a second positive current collector 54. While not shown, the second cell 40 also has electrolyte. The stack assembly 39 further includes a third cell 60 that includes each of a third negative current collector 72, a third negative electrode 62, a third 66, a third positive electrode 64, and a third positive current collector 74. While not shown, the third cell 60 also has electrolyte. Each of negative current collector 32, second negative current collector 52, and third negative current collector 72 has an external tab 76, so as to be electrically connected in parallel to one another by conduit 78. Each of positive current collector 34, second positive current collector 54, and third positive current collector 74 has an external tab 80 to be electrically connected in parallel to one another by conduit 82. As appreciated by those of skill in the art, a plurality of cells beyond three may be stacked to form a single stack assembly. Further, multiple stack assemblies may be used together.

The battery may be formed from a heat-sealable, flexible foil that is sealed to enclose at least a portion of the stack assembly 39. Therefore, any number of cells may be stacked or otherwise placed adjacent to each other to form a cell stack, which may also be referred to as a lithium-based secondary electrochemical battery module. Further, although not shown in FIG. 2, additional layers, such as, but not limited to, frames, cooling layers, or both may also be positioned in the space between individual cells. The number of distinct cells varies with a required voltage output of each battery module, for example only, greater than 20 cells, optionally greater than 30 cells in a stack may be used, by way of non-limiting example. Likewise, the number of interconnected battery modules may vary to produce the necessary total output voltage for a specific application.

The lithium-based electrochemical battery module can be used as a plug-in hybrid electric vehicle (PHEV). Further, a plurality of battery modules may be combined to form a lithium-based secondary battery pack. By way of example, the battery module may be sufficiently sized to provide a necessary voltage for powering a hybrid electric vehicle (HEV), an electric vehicle (EV), a plug-in hybrid electric vehicle (PHEV), and the like, for example, approximately 300 to 400 volts or more, depending on the required application.

Although not shown, the lithium-based battery may be provided as a soft, flat pouch having flat terminals that are flush to a body of the device requiring power, such as a cell phone battery or in a plastic case having large terminals, for example, in the form of aluminum and copper sheets, such as battery packs for vehicles. In general, the lithium-based battery may be connected in a circuit to either discharge the lithium-based battery via a load present in the circuit, or charge the lithium-based battery by connecting to an external power source.

In various aspects, the present disclosure provides thin bipolar current collectors that may be used to improve electrochemical cell performance, by reducing weight of the overall stack of cells, while increasing the specific energy and energy density (charge capacity per unit volume and mass) of the battery module. In certain aspects, the present disclosure contemplates methods for forming such bipolar current collector structures. Further, bipolar current collectors made in accordance with certain aspects of the present disclosure provide a new electrochemical cell design for tab-free high-voltage lithium batteries.

In certain aspects, the bipolar current collector for a lithium-based electrochemical cell or battery may be a bimetallic current collector. A method of forming such a bimetallic current collector includes depositing an electrically conductive material (e.g., metal) on an electrically conductive surface to form a continuous and thin coating of the electrically conductive metal. A bimetallic bipolar film is thus formed with the electrically conductive metal coating formed on the electrically conductive surface formed of a different material. In certain variations, the electrically conductive metal is selected from the group consisting of: copper, nickel, alloys, and combinations thereof. In other variations, the present disclosure contemplates a method that includes depositing copper on a surface comprising aluminum to form a continuous copper coating. By "continuous" it is meant that greater than or equal to about 99% of the surface area of the underlying substrate has a material, such as copper, coating it. Smooth may be understood to be an average surface roughness (roughness average or $R_A$) of greater than or equal to about 0.01 micrometers (μm) to less than or equal to about 0.1 μm In certain variations, the process by which the electrically conductive material, such as copper or nickel, is deposited may be selected from the group consisting of: electrolytic deposition, electroless displacement deposition, and combinations thereof. In using such processes, a bimetallic bipolar current collector is formed that has an average thickness of less than or equal to about 25 micrometers. Thus, a combined average thickness for the coated area, including a thickness of the underlying substrate and the deposited coating, is less than or equal to about 25 micrometers (μm), optionally less than or equal to about 20 μm, optionally less than or equal to about 15 μm, and in certain variations, optionally less than or equal to about 10 μm.

An average thickness of the deposited material coating, for example, a copper coating, may be greater than or equal to about 2 monolayers (e.g., 0.5 nm for copper) to less than or equal to about 25 μm, for example, optionally greater than or equal to about 1 nm to less than or equal to about 20 μm, optionally greater than or equal to about 2 nm to less than or equal to about 15 μm, optionally greater than or equal to about 3 nm to less than or equal to about 10 μm, and in certain variations, optionally greater than or equal to about 4 nm to less than or equal to about 1 μm.

In certain variations, the substrate is selected from the group consisting of: plastic, a graphene coated plastic, metal foil, and combinations thereof. Thus, the substrate itself may comprise aluminum (e.g., an aluminum foil substrate) or the substrate has an exposed surface coating comprising aluminum. As will be described further below, the substrate may be flexible and in certain variations may be folded or bent in predetermined regions. An average thickness of the substrate may be less than or equal to about 25 μm, for example, optionally less than or equal to about 20 μm, optionally less than or equal to about 15 μm, and in certain variations, optionally less than or equal to about 10 μm.

By "electrolytic" it is meant that the coating is applied to a surface of a substrate in the presence of an applied voltage or potential during the deposition process, typically while immersing the surface in a liquid medium having an electrolyte. In contrast, by "electroless" it is meant that the coating is applied to a surface of a substrate in an electroless process without use of an applied voltage or potential during the deposition, also while the surface is in contact with a liquid medium. Electroless plating generally refers to a chemically applied metal-based coating, where the depositing of the metal material occurs via an autocatalytic or displacement deposition reactions, rather than being driven by presence of an electrical current or potential. The electroless deposition process can provide a thin, highly controlled, uniform density coating with continuous surface coverage. Electrolytic deposition processes can vary in density and coverage of a deposited coating. Either electrolytic or electroless deposition processes in accordance with the present disclosure described further below provide a smooth and continuous coating, while coating thickness can be controlled and very thin, and improved mechanical contact is further achieved between the coating material and underlying substrate.

While bilayer metallic structures have been formed by a cladding method or a bonding method, such bilayer metallic structures cannot be readily incorporated into a battery. For example, in a cladding method, an aluminum foil is clad to a copper foil and then the bilayer film is passed by rollers. In order to be clad together and rolled, such foils/films have a relatively large thickness to provide ample thickness for diffusion and to withstand mechanical stresses of rolling. Hence, such assemblies are relatively thick and have poor mechanical integrity, including a propensity to delaminate. Further, the large thickness makes the assembly too heavy and/or bulky when incorporated into a battery. Similarly, the bonding method typically disposes an adhesive between two thin films, for example, a copper foil with a conductive adhesive can be bonded to a thin aluminum foil and then passed by a heated drum roller to set the adhesive. In addition to being thicker to permit rolling, a bonded bilayer structure can suffer from diminished performance due to the binder and a modified mechanical property of the bipolar film.

In one variation, the process is electrolytic deposition of a metal, such as copper or nickel, to electroplate a layer comprising copper or nickel onto a surface comprising aluminum. In such a variation, the electrolytic process may include disposing or contacting the surface with a liquid medium or electrolyte comprising a copper-containing compound or nickel-containing compound. In one variation, the copper-containing compound may be in the form of complexed copper salt solutions. Suitable complexed copper salts may include: copper sulfates, copper chlorites, copper cyanide, copper tetraethylenepetamine, ammoniacal copper sulfate, copper pyrophosphate, ammoniacal copper chloride, ammoniacal solutions of copper MOFs, including ammoniacal copper benzenetricarboxylate MOF (Cu-BTC) solutions, ammoniacal NOTT-116 solution, ammoniacal copper NOTT-100 solution, ammoniacal copper MOF74 solution, and combinations thereof. In another variation, a nickel-containing compound may be selected from the group consisting of: nickel sulfate, nickel chloride, nickel fluoroborate, and combinations thereof. Other optional additives that may be added to the liquid medium (e.g., plating bath) include sulfuric acid, stannous chloride, cadmium sulfate, boric acid, sodium fluoride, sodium chloride, potassium persulfate, and combinations thereof. In certain aspects, suitable concentrations of the complexed copper salts may be greater than or equal to about 40 to less than or equal to about 250 g/L and for nickel salts greater than or equal to about 150 g/L to less than or equal to about 300 g/L. The liquid medium may be aqueous and may comprise water or other solvents/vehicles. The liquid medium may be provided as a bath in which the surface to be coated is immersed or contacted.

The substrate may be attached to a contact having a first polarity to create a working electrode. The conductive substrate, or working electrode, is contacted with or immersed in a liquid medium that may be an electrolyte comprising one or more complexed copper salts and water. A counter electrode may be placed in electrical communication with a source of potential so as to have a second polarity opposite to the first polarity. The counter-electrodes and the working electrodes are generally immersed in the same liquid medium (e.g., electrolyte solution). The counter electrode may be formed of copper or nickel depending on the element being deposited. After contacting or immersing the conductive substrate in the liquid medium, a negative voltage relative to the counter electrode is applied. The passage of current through such a solution is accompanied by chemical changes at the electrodes, driving the deposition of the metal, for example, copper onto the surface of the substrate serving as the working electrode to form a thin, continuous, smooth coating thereon. In certain variations, a current density of the applied voltage may be greater than or equal to about $0.005$ A/cm$^2$ to less than or equal to about $0.5$ A/cm$^2$. A temperature of the liquid medium may be greater than or equal to about 20° C. to less than or equal to about 60° C. A pressure may be at ambient conditions. Plating time depends upon the desired thickness of the deposited material.

In other variations, the process by which the material, such as copper, is deposited may be an electroless displacement deposition process. The electroless deposition process may include disposing or contacting the surface with a liquid medium comprising a copper-containing ligand compound, for example a copper-containing ligand, such as copper salts or copper metal organic frameworks (Cu-MOF) in concentrated ammonia solutions systems. One suitable Cu-MOF is like benzenetricarboxylate MOF (Cu-BTC). Displacement deposition can occur when ions of a less reactive metal, such as copper, come in contact with a more reactive surface, such as aluminum. Aluminum dissolves and the copper ions deposit directly on the surface of the aluminum surface. Copper ions in copper-containing ligands allows for a continuous thin film of copper on aluminum, for example.

Suitable copper-containing ligand compounds may include: ammoniacal solution of benzenetricarboxylate MOF (Cu-BTC), ammoniacal solution of cupric chloride, ammoniacal solutions of copper sulfate, and combinations thereof. In certain aspects, the reagent is a Copper MOF compound. Suitable examples of Copper MOF compounds include: Cu-BTC, NOTT-116, NOTT-100, MOF74 (Cu) and combinations thereof. Suitable concentrations of the copper-containing ligand compound may be greater than or equal to about 15 g/L to less than or equal to about 140 g/L in the liquid medium. The liquid medium may be aqueous and may comprise water or other solvents/vehicles. The liquid medium may be provided as a bath in which the surface to be coated is immersed or contacted.

The surface of the substrate to be coated may be contacted with or immersed in the electroless liquid medium. A temperature of the liquid medium may be greater than or equal to about 20° C. to less than or equal to about 80° C., for example, about 60° C. in certain variations. A pressure may be at ambient conditions. The electroless deposition may be conducted for greater than or equal to about 1 minute to less than or equal to about 30 minutes, by way of example. In one non-limiting example, an aluminum sample is immersed in a liquid medium comprising ammonia water-Cu(BTC) MOF at a concentration of 15 g/L at 60° C. for 15 minutes.

In certain variations, the surface of the substrate to be coated may be pretreated to further enhance formation of the coating. Thus, the methods may include forming a pretreatment layer comprising zinc formed by reacting the aluminum on the surface with a zincate. A zincate pretreatment can improve adhesion of the copper or the nickel deposited on aluminum. The zincate treatment replaces the passive film on aluminum with a thin zinc layer that can then subsequently be easily replaced with copper during the plating process, thus providing good adhesion with the aluminum substrate. Such a zinc-containing pretreatment layer is particularly suitable for use prior to the electroless displacement deposition process. It should be noted that the pretreatment is selected to be compatible with the electrolytic and/or electroless process, so that the metal on the surface of the aluminum substrate is capable of initially displacing aluminum oxides, but also of dissolving to permit the metal like copper or nickel to deposit on the aluminum surface. A suitable zincate solution would include zinc oxide and sodium hydroxide as main ingredients. The concentration of zinc oxide can be greater than or equal to about 5 to less than or equal to about 100 g/L while that of sodium hydroxide can be greater than or equal to about 50 g/L to less than or equal to about 525 g/L. Other additives such as ferric chloride, potassium sodium tartrate, sodium nitrate are added to improve the uniformity of the zinc deposit on the aluminum surface. The process is normally carried out at room temperature for less than 30 seconds.

Figure 3:
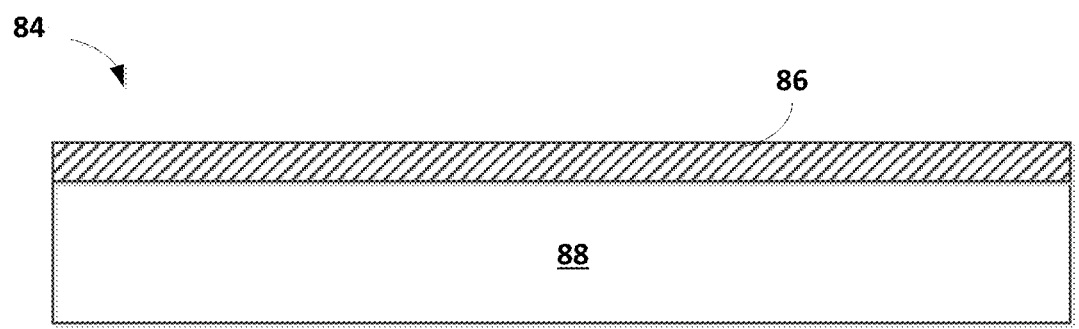
FIG. 3 shows a side view of a bipolar current collector having an electrically conductive material coating prepared in accordance with certain aspects of the present disclosure.

As shown in FIG. 3, a bipolar current collector 84 is thus formed by such techniques according to the present disclosure. The bipolar current collector 84 has a thin, smooth, and continuous coating 86 of electrically conductive material disposed on an electrically conductive substrate 88. In one variation, the electrically conductive substrate 88 may be an aluminum sheet or foil having a thickness of about 10 micrometers, while an electrically conductive continuous coating 86 may be a copper coating having a thickness of less than or equal to about 2 micrometers, so that a total thickness of the bipolar current collector 84 is less than about 15 micrometers.

In certain variations, smooth and continuous coatings of copper (or other conductive materials like nickel) on aluminum are formed by such methods. The mechanical contact between copper and aluminum is enhanced due to the electroplating nature of the coating where an electrolytic process is used, as compared to mechanical joining by cladding or adhesion of two preformed materials. Further, the copper coating thickness can be very thin, while being highly controlled. Such copper or nickel coatings on aluminum are robust, highly conductive, and thin, making them particularly advantageous for incorporation into batteries. Additionally, an aluminum substrate having a copper coating, for example, combines the low density of aluminum with the high thermal and electrical conductivities of copper to arrive at a cost effective heat sink for thermal management of energy storage applications.

In other aspects, the present disclosure contemplates a method of forming a bipolar current collector for a battery that comprises depositing a material selected from the group consisting of: nickel, copper, aluminum, graphene, alloys, and combinations thereof on a first surface of a flexible substrate. A flexible substrate is capable of bending at least about 180° without fracturing or damage. The flexible substrate may be formed of a polymeric or plastic material, such as polyester, polypropylene, polyimide, polyethylene, and the like. Plastic films reduce weight and thickness as compared to metal substrates, while providing good mechanical integrity and strength. In certain aspects, the substrate may be a polymeric material that is further coated with a thin layer of nickel, copper, aluminum, graphene, and the like, which serves as the exposed surface of the substrate. In other variations, the flexible substrate may be a metal foil, such as aluminum foil or a film or sheet, such as graphene coated sheets.

Graphene may be deposited via a physical or chemical vapor deposition process on a polymeric substrate and may remain intact or separated from the substrate to form an independent sheet. Graphene can be deposited over a copper-containing material to facilitate morphological control during deposition, typically over a thick copper foil. After dissolving the copper foil, the graphene may be transferred to a flexible polymeric substrate. However, the dissolution and transfer process of the thick copper foil introduces additional and longer processing steps to form the final graphene coated plastic sheet. In accordance with certain aspects of the present disclosure, a metal-coated substrate formed as described above can be used as a substrate for forming graphene. Thus, in one aspect, a thin aluminum foil having a thin copper coating thereon can be used as a substrate for forming graphene. The graphene can be deposited on the copper coating over the aluminum foil using chemical vapor deposition (CVD) techniques to form the desired graphene properties using same CVD process. However, the thinner aluminum foil having the copper-coating can be dissolved more easily and the graphene can be transferred to the plastic carrier. In certain variations, the flexible substrate may be transparent, for example, when the coating is formed of graphene. A graphene-coated sheet provides reduced weight and reduced thickness, while providing good electrical conductivity. Further, a flexible substrate may be processed in a continuous roll-to-roll production process.

In certain variations, the flexible substrate may be folded so that the first surface is exposed and defines a first side, a folded region, and a second side. The first side defines a first current collector having a first polarity and the second side defines a second current collector having a second polarity opposite to the first polarity. By such a method, a bipolar current collector is formed. The bipolar current collector has a joint-free or weld-free design.

For example, in one variation, a bipolar current collector may be formed on a flexible substrate in the form of an aluminum foil or sheet that has a copper-containing coating formed thereon (or a nickel-containing coating), where a first side may serve as a current collector for the cathode (e.g., the aluminum side) and a second side may serve as a current collector for the anode (e.g., the copper-containing coating or the nickel-containing coating). In certain aspects, such a bipolar bimetallic current collector is advantageous in that it uses less copper by depositing a thin copper layer on aluminum, allowing for weight and volume reduction of the entire assembly, in addition of reducing overall pack/stack resistance while increasing energy density. In other variations, a bipolar current collector may be formed on a flexible substrate having a conductive material on a first surface that is exposed and after folding defines a first side, a folded region, and a second side. Such a conductive material may be graphene or nickel, by way of example. The first side thus defines a first current collector having a first polarity and the second side defines a second current collector having a second polarity opposite to the first polarity.

FIG. 4 shows one variation of a bipolar current collector 90 formed by such a method. A flexible substrate 92 has a coating 94 formed thereon on a first surface 96. In such an embodiment, the coating may be formed of an electrically conductive material that can serve as both a positive current collector and a negative current collector when incorporated into a battery cell. For example, suitable electrically conductive materials that can serve as both a positive and negative current collector material include nickel and graphene. The flexible substrate 92 is folded and forms a folded bent region 98 so that the first surface 96 having coating 94 is exposed on both sides of the bipolar current collector 90. In certain variations, the coating 94 may be a graphene coating or a nickel coating and the flexible substrate 92 may be any of the polymeric materials discussed previously.

Another variation of a bipolar current collector 100 is shown in FIGS. 5 and 6. The bipolar current collector 100 is formed from a flexible substrate 102. The method for forming the bipolar current collector 100 may comprise depositing a first material on a first surface 112 of the flexible substrate 102 to form a first coating 104. The first material is optionally selected from the group consisting of: nickel, copper, aluminum, graphene, alloys, and combinations thereof. Then, a second material distinct from the first material is deposited on a select portion of the flexible substrate 102 to form a second coating 106 disposed over the first coating 104. The second material is distinct from the first material and may be selected from selected from the group consisting of: nickel, copper, aluminum graphene, alloys, and combinations thereof. After the flexible substrate 102 is folded on itself, a folded bent region 108 is formed.

Thus, the first surface 112 defines a first portion 110 having the first coating 104 exposed. The first surface 112 also defines a second portion 114 having the second coating 106 exposed. Notably, the second coating also extends over the folded bent region 108. The first portion 110 and the second portion 114 of the first surface 112 are distinct regions so that the first coating 104 defines a first side 120 of the bipolar current collector 100 and the second coating 106 defines a second side 122 after the folding. The bent current collector thus creates a bipolar structure shared between cells and adjacent to electrodes of different polarities, which potentially reduces overall weight and improves both energy and specific energy densities.

In one variation, the first coating 104 may be an aluminum coating, the second coating 106 may be a copper coating, and the flexible substrate 102 may be any of the polymeric materials discussed previously. In another variation, the first coating 104 may be an aluminum coating, the second coating 106 may be a nickel coating, and the flexible substrate 102 may be any of the polymeric materials discussed previously. Where the second coating 106 comprises nickel or copper, the depositing is optionally selected from the group consisting of: electrolytic deposition, electroless displacement deposition, and combinations thereof. As described previously above, such processes form a bipolar current collector has an overall thickness of less than or equal to about 25 micrometers.

In other aspects, the present disclosure contemplates a new lithium-based electrochemical cell or battery architecture incorporating such bipolar current collectors formed in accordance with the present disclosure. A stack of cells 130 for a lithium-ion battery is shown. Each current collector 132 of the same polarity has an external tab 136. Notably, current collectors of the opposite polarity in the same cells are not shown, but have the same external tabs and are processed in the manner described herein. The plurality of tabs 136 are forced downwards and commonly welded to a terminal conductive tab 140, for example, by ultrasonic welding. The tab 136 attachments are difficult to process for lithium electrodes, may be limited on a maximum high current tolerance, and in certain aspects, potentially could be broken due to tension during swelling in certain battery systems under certain conditions.

Figure 7:
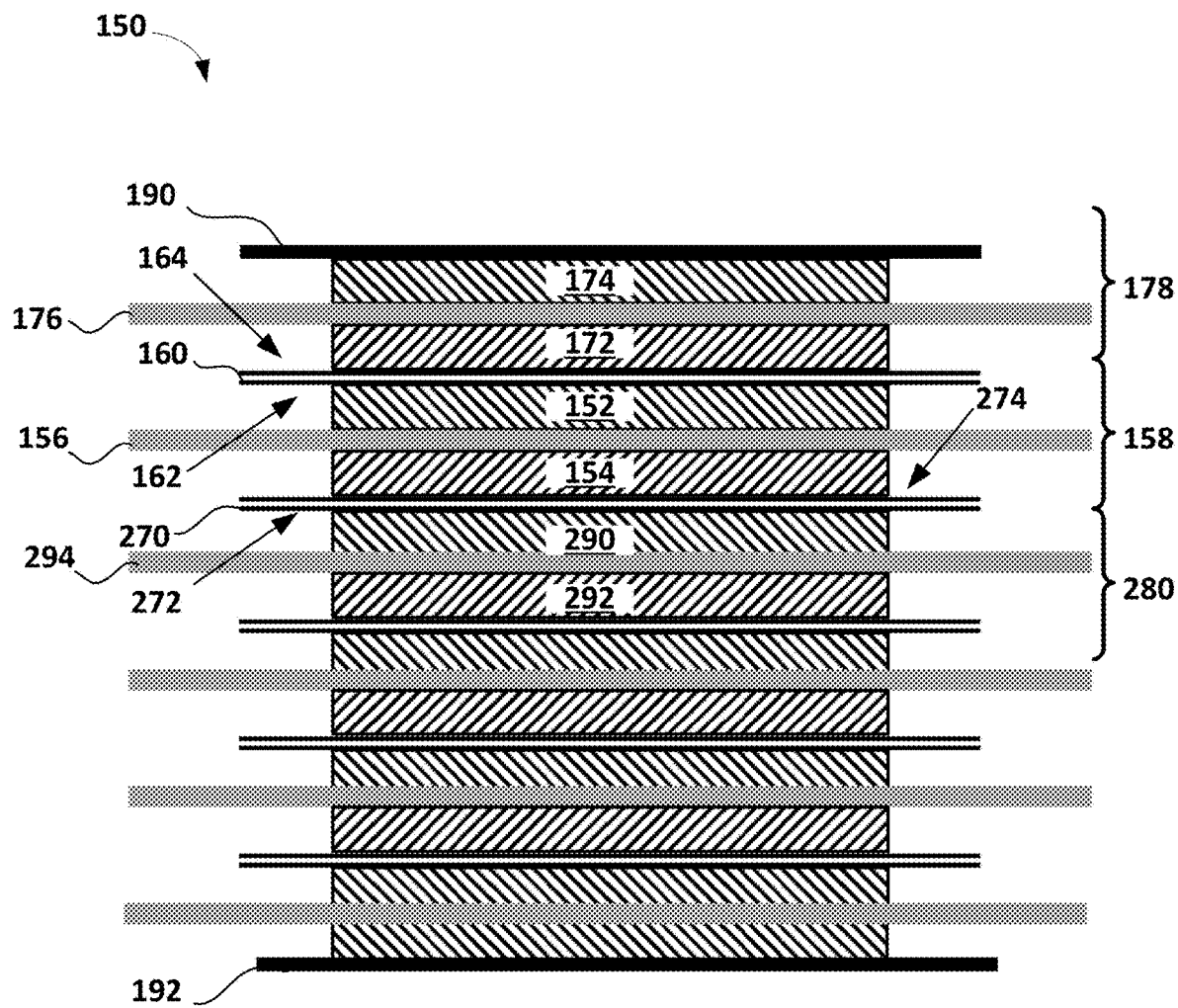
FIG. 7 shows a tab-free configuration for a stack assembly for a lithium-based battery having a plurality of cells and a plurality of bipolar current collectors formed in accordance with certain aspects of the present disclosure.

Incorporating bipolar current collectors prepared in accordance with certain aspects of the present disclosure provides a new battery design where the tabs for the internal cells are eliminated. FIG. 7 shows an exemplary stack assembly 150 for a battery. The stack assembly 150 may include a first electrode 152 having a first polarity and a second electrode 154 having a second polarity opposite to the first polarity. A first separator 156 is disposed between the first electrode 152 and the second electrode 154, where the first electrode 152, the second electrode 154, and the first separator 156 define a first cell 158 having electrolyte (not shown) disposed therein. A bipolar current collector 160 is also part of the stack assembly 150. The bipolar current collector 160 has a first side 162 and a second side 164 opposite to the first side 162, where the first side 162 is disposed adjacent to the first electrode 152 and is in electrical communication therewith. In certain variations, the bipolar current collector 160 may be a bimetallic current collector formed by depositing a thin, continuous, electrically conductive material on a thin electrically conductive substrate, for example, an aluminum sheet having a copper coating, where an overall thickness of the bipolar current collector 160 is less than or equal to about 25 µm.

The stack assembly 150 also includes a third electrode 172 having a third polarity and a fourth electrode 174 having a fourth polarity opposite from the third polarity. A second separator 176 disposed between the third electrode 172 and the fourth electrode 174, wherein the third electrode 172, the fourth electrode 174, and the second separator 176 define a second cell 178 having electrolyte disposed therein. The second side 164 of bipolar current collector 160 is disposed adjacent to the third electrode 172 and is in electrical communication therewith. Notably, the first polarity and the third polarity are opposite to one another.

In certain aspects, the stack assembly 150 further comprises a first terminal end plate 190 disposed at a first terminal end 194 of the stack and a second terminal end plate 196 disposed at a second terminal end 200 of the stack assembly 150. The first cell 158 and the second cell 178 are disposed between the first terminal end plate 190 and the second terminal end plate 196 and the first cell 158 and the second cell 178 are both tab-free and weld-free, as will be discussed further below.

Figure 8:
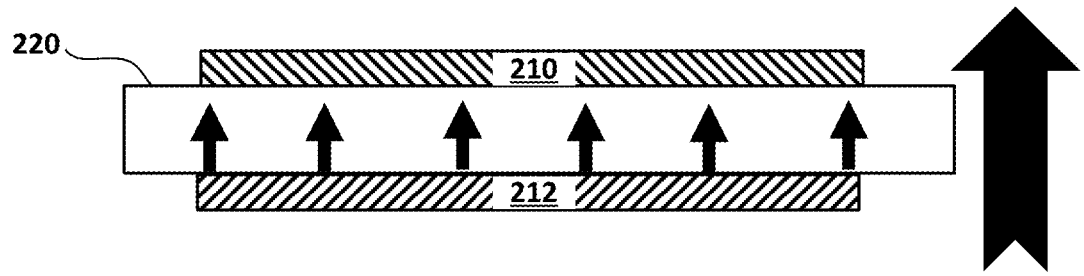
FIG. 8 is a schematic showing current flow for a bipolar current collector formed in accordance with certain aspects of the present disclosure.
Figure 9:
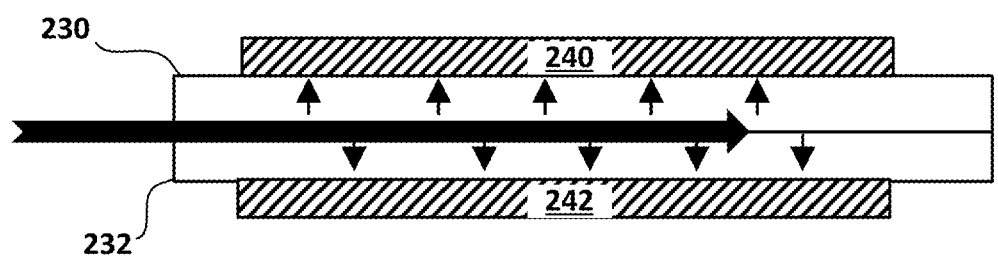
FIG. 9 is a schematic showing current flow for two distinct bipolar current collectors.

FIGS. 8 and 9 show schematics of different bipolar current collector designs. In FIG. 8, a first electrode 210 has a first negative polarity and a second electrode 212 has a second opposite positive polarity, similar to the orientation of the electrodes in the stack assembly 150 of FIG. 7. A bipolar current collector plate 220 is disposed between the first electrode 210 and the second electrode 212 and current flows in the direction of the arrow shown. In this manner, current flows in a direction indicated.

FIG. 9 shows two distinct current collectors adjacent to one another in a pair configuration as typically occurs in a stack assembly. A first current collector 230 has a negative polarity. A second current collector 232 adjacent to the first current collector 230 likewise has a negative polarity. Thus, a first electrode 240 is a negative electrode adjacent to the first current collector 230, while a second electrode 242 is also a negative electrode adjacent to the second current collector 232. The arrows show the direction of flow of current.

With renewed reference to FIG. 7, additional cells with additional first electrodes, second electrodes, and separators may be included in the stack assembly 150 and separated by distinct bipolar current collectors prepared in accordance with certain aspects of the present disclosure. In FIG. 7, the bipolar current collector 160 may be a first bipolar current collector and the stack assembly 150 further comprises a second bipolar current collector 270 having a first side 272 and a second side 274 opposite to the first side 272. At least one additional third cell 280, in addition to the first cell 158 and the second cell 178, is provided. The third cell 280 is disposed between the first terminal end plate 190 and the second terminal end 192 and is adjacent to the first side 272 of the second bipolar current collector 270 and in electrical communication therewith. The third cell 280 comprises a fifth electrode 290 having a fifth polarity and a sixth electrode 292 having a sixth polarity opposite from the fifth polarity. A third separator 294 is disposed between the fifth electrode 290 and the sixth electrode 292, wherein the fifth electrode 290, the sixth electrode 292, and the third separator 294 define the third cell 280 having electrolyte disposed therein (not shown). In certain aspects, like the first and second cells 158, 178, the third cell 280 is tab-free. The novel design eliminates the need for a tab attachment process, which affords many benefits to the cell, such as increased energy density and higher rate tolerances. Such a design also provides high voltage for a single cell based on the internal serial connection design.

The cells and bipolar current collectors may be made of any of the previously described materials, including in certain variations, a bipolar current collector formed from a folded flexible substrate selected from the group consisting of: plastic, graphene, aluminum foil, and combinations thereof, wherein an exposed surface of the folded flexible substrate comprises an electrically conductive material selected from the group consisting of: nickel, copper, graphene, alloys, and combinations thereof. As shown, more than three distinct cells and bipolar current collectors are included in the stack assembly 150, for purposes of illustration, five distinct cells are provided. However, it should be noted that stack assemblies are not limited to the number of layers and cells shown or to the stack configuration shown.

Figure 10:
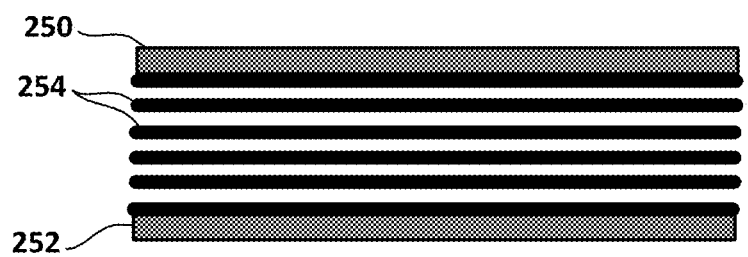
FIG. 10 shows a side view of an exemplary tab-free design for a stack assembly for a lithium-based battery including a plurality of cell layers and a plurality of bipolar current collectors formed in accordance with certain aspects of the present disclosure.

As shown in FIG. 10, a first tab-free stack assembly design for a battery is shown, where no tabs and no welding is are required. Such a tab-free stack assembly design can incorporate bipolar current collectors like those in FIG. 8. A first terminal end plate 250 and a second terminal end plate 252 sandwich a plurality of cells 254. In this design, the first and second terminal end plates 250, 252 may be electrically connected to an external circuit without use of any tabs.

Figure 11:
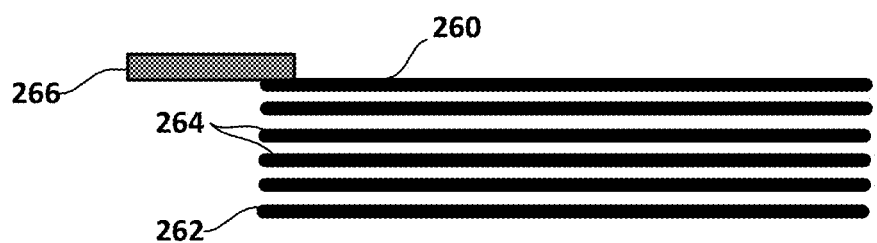
FIG. 11 shows a side view of another exemplary design for a stack assembly for a lithium-based battery including a plurality of cell layers free of any tabs and a plurality of bipolar current collectors formed in accordance with certain aspects of the present disclosure, where tabs are only provided on each terminal end current collector.

In FIG. 11, an alternative variation is shown, where a first terminal end plate 260 and a second terminal end plate 262 sandwich a plurality of cells 264. In this design, the first terminal end plate 260 may have a first tab 266, which may be electrically connected to an external circuit. While not shown, the second terminal end plate 262 may have a second tab, as well.

Figure 12:
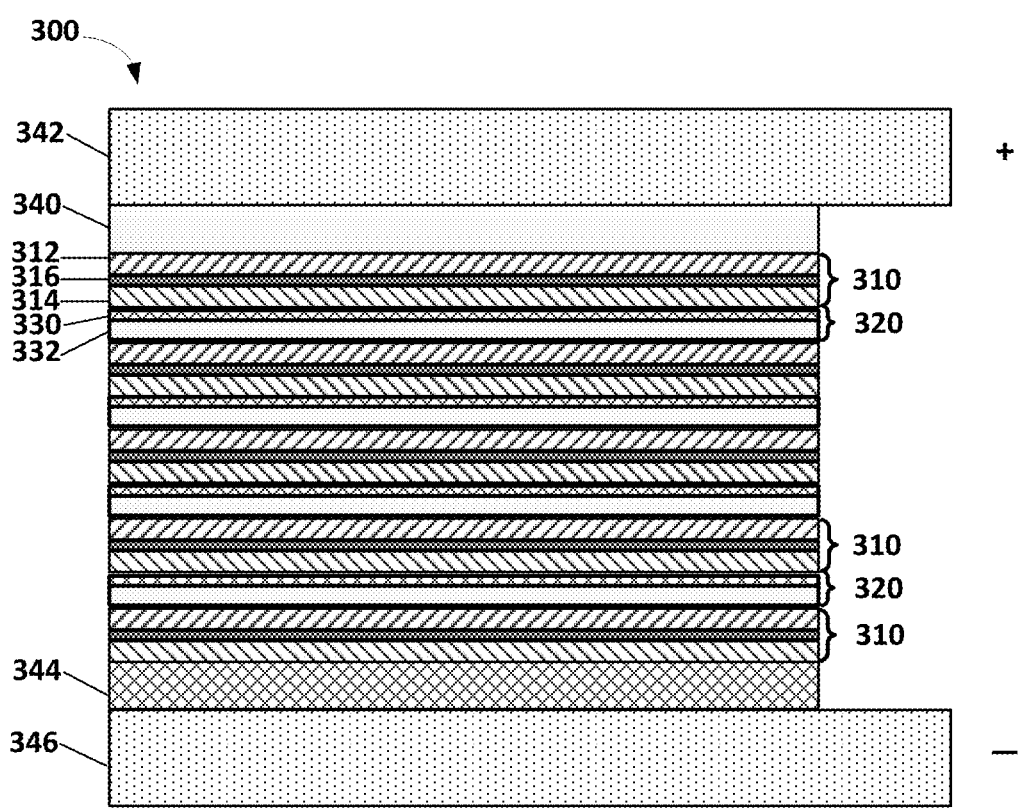
FIG. 12 shows a side view of yet another exemplary design for a stack assembly for a lithium-based battery including a plurality of cell layers free of any tabs and a plurality of thin bipolar current collectors formed in accordance with certain aspects of the present disclosure, where the plurality of cells in the stack assembly are tab-free and weld-free.

FIG. 12 shows a tab-free and weld-free stack assembly 300 for a high-voltage lithium ion battery that includes a plurality of cells 310. Each cell 310 includes a first electrode 312 having a first polarity and a second electrode 314 having a second polarity opposite to the first polarity. A first separator 316 is disposed between the first electrode 312 and the second electrode 314. Each cell may also have electrolyte (not shown) disposed therein. A bipolar current collector 320 is also part of the stack assembly 300. The bipolar current collector 320 has a first layer 330 on a first side formed of a conductive material, such as copper for a negative collector side, and a second layer 332 on a second side opposite to the first side, which may be formed of a positive collector material, such as aluminum. The first layer 330 is disposed adjacent to the second electrode 314 of the cell 310 and in electrical communication therewith. In certain variations, the bipolar current collector 320 may be a bimetallic current collector formed by depositing a thin, continuous, electrically conductive material on a thin electrically conductive substrate, for example, an aluminum sheet having a copper coating, where an overall thickness of the bipolar current collector 320 is less than or equal to about 25 µm.

The stack assembly 300 also includes a first terminal conductive layer 340 and a second terminal conductive layer 342 at an opposite end of the stack assembly 300. The first terminal conductive layer 340 may be formed of a material having a first polarity, for example, a negative current collector material like copper. The second terminal conductive layer 342 may have a second opposite polarity to the first polarity of the first terminal conductive layer 340, for example, a positive current collector material like aluminum. A first end plate current collector 344 is disposed adjacent to the first terminal conductive layer 340. A second end plate collector 346 is likewise disposed adjacent to the second terminal conductive layer 342. The first end plate current collector 344 and the second end plate current collector 346 can be attached to respective external leads. Each of the cells 310 of the stack assembly 300 are connected in series and do not have individual tabs, thus each of the cells 310 are tab-free. Further, the stack assembly 300 may be weld-free. Notably, the design and polarities may be reversed and the stack assembly may include other components, as previously discussed above.

Figure 13:
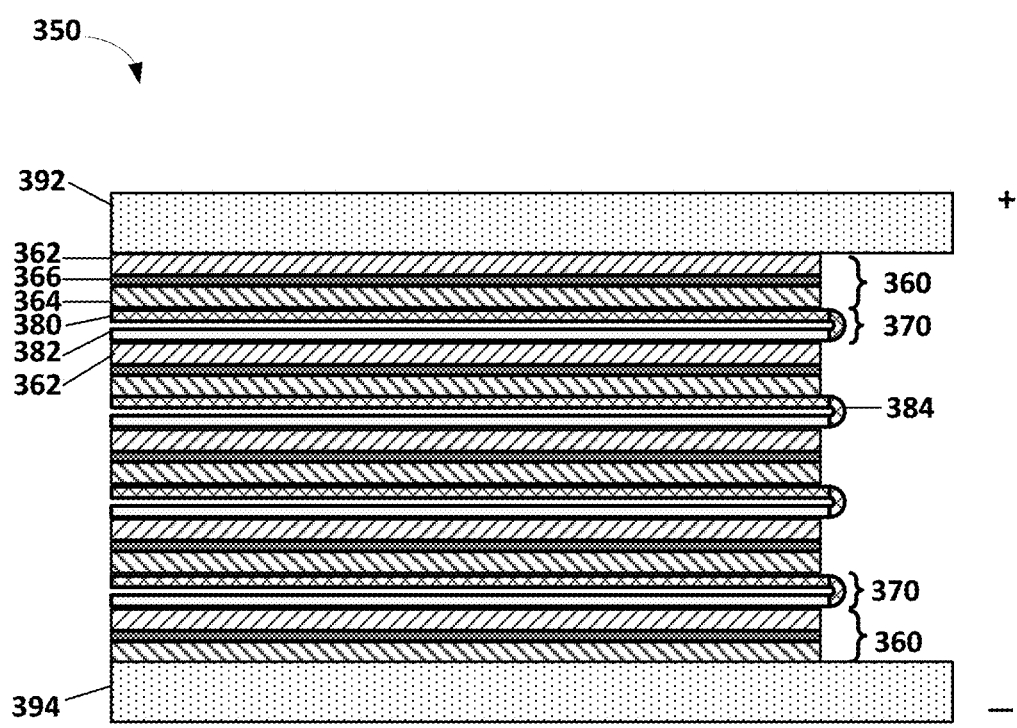
FIG. 13 shows a side view of yet another exemplary design for a stack assembly for a lithium-based battery including a plurality of cell layers free of any tabs and a plurality of thin folded bimetallic bipolar current collectors formed in accordance with certain aspects of the present disclosure, where the plurality of cells in the stack assembly are weld-free.

FIG. 13 shows a weld-free stack assembly 350 for a high-voltage lithium ion battery that includes a plurality of cells 360. Each cell 360 includes a first electrode 362 having a first polarity and a second electrode 364 having a second polarity opposite to the first polarity. A first separator 366 is disposed between the first electrode 362 and the second electrode 364. Each cell 360 may also have electrolyte (not shown) disposed therein. Bipolar current collectors 370 are also part of the stack assembly 350 disposed between cells 360.

The bipolar current collector 370 is folded and defines a first side 380 coated with a first conductive material, such as copper for a negative collector side, and a second side 382 on a second side opposite to the first side, which may be formed of or coated with a positive collector material, such as aluminum, as previously described above in the context of FIGS. 4-6, by way of example. The bipolar current collector 370 may be a bimetallic current collector formed by depositing a thin, continuous, electrically conductive material on a thin flexible substrate, for example, an aluminum sheet having a copper coating, where an overall thickness of the bipolar current collector 370 is less than or equal to about 25 µm. In other variations, a plastic substrate may have a copper or nickel coating on a first side 380 and aluminum on a second side 382. The bipolar current collector 370 also includes a folded joint region 384 that has an exposed surface with the same first conductive material, for example, copper. The first side 380 is disposed adjacent to the second electrode 364 of the cell 360 and in electrical communication therewith. The second side 382 is disposed adjacent to a first electrode 362 on an opposite side.

The stack assembly 350 also includes a first end plate current collector 392 and a second end plate current collector 394 at an opposite end of the stack assembly 350, each disposed adjacent to a cell 360. The first end plate current collector 392 may be formed of a material having a first polarity, for example, a positive current collector material like aluminum. The second end plate current collector 394 may have a second opposite polarity to the first polarity of the first end plate current collector 392, for example, a negative current collector material like copper or nickel. The first end plate current collector 392 and the second end plate current collector 394 can be attached to respective external leads. The folded joint region 384 protrudes between each cell 360 and serves as a tab for each of the cells 310. Thus, each folded joint region 384 of the bipolar current collector 370 may be attached to external leads. In using the folded design of the bipolar current collector 370, the stack assembly 350 may be weld-free. Notably, the design and polarities may be reversed and the stack assembly may include other components, as previously discussed above.

Figure 14:
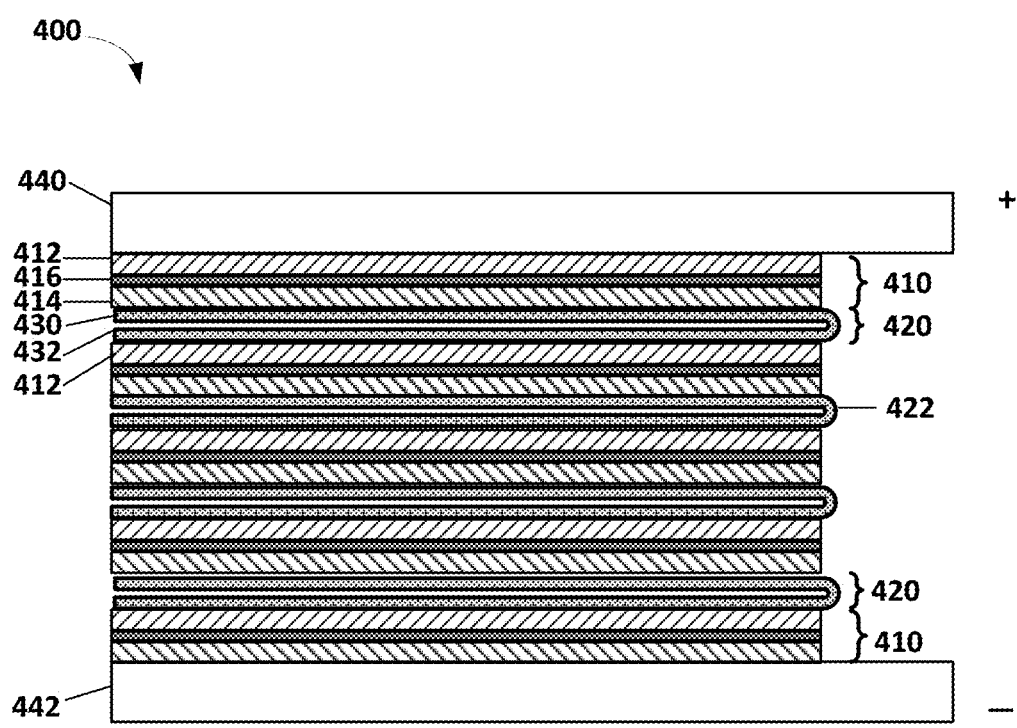
FIG. 14 shows a side view of another exemplary design for a stack assembly for a lithium-based battery including a plurality of cell layers free of any tabs and a plurality of thin folded bipolar current collectors formed having a single conductive material in accordance with certain aspects of the present disclosure, where the plurality of cells in the stack assembly are weld-free.

FIG. 14 shows yet another weld-free stack assembly 400 for a high-voltage lithium ion battery that includes a plurality of cells 410. Each cell 410 includes a first electrode 412 having a first polarity and a second electrode 414 having a second polarity opposite to the first polarity. A first separator 416 is disposed between the first electrode 412 and the second electrode 414. Each cell 410 may also have electrolyte (not shown) disposed therein. A bipolar current collector 420 is also part of the stack assembly 400 disposed between adjacent cells 410.

The bipolar current collector 420 is folded and defines a first side 430 and a second side 432 opposite to the first side. The first side 430 may serve as a current collector having a first polarity and the second side 432 may serve as a current collector having a second opposite polarity. In this variation, the bipolar current collector 420 may be a bipolar current collector formed by depositing a thin, continuous, electrically conductive material on a thin flexible substrate, for example, graphene or nickel disposed on a flexible polymeric substrate, where an overall thickness of the bipolar current collector 420 is less than or equal to about 25 µm. In such a variation, the same electrically conductive material may serve as a current collector for sides having both a first polarity and a second polarity. The bipolar current collector 420 also includes a folded joint region 422 that has an exposed surface with the same conductive material, for example, graphene or nickel. The first side 430 is disposed adjacent to the second electrode 414 of the cell 410 and in electrical communication therewith. The second side 432 is disposed adjacent to a first electrode 412 of a distinct cell 410 on an opposite side of the bipolar current collector 420.

The stack assembly 400 also includes a first end plate current collector 440 and a second end plate current collector 442 at an opposite end of the stack assembly 400, each disposed adjacent to a cell 410. The first end plate current collector 440 may be formed of a material having a first polarity, for example, a positive current collector material like aluminum. The second end plate current collector 442 may have a second opposite polarity to the first polarity of the first end plate current collector 442, for example, a negative current collector material like copper or nickel. The first end plate current collector 440 and the second end plate current collector 442 can be attached to respective external leads. The folded joint region 422 protrudes from the stack and serves as a tab for each of the cells 410. In using the folded design of the bipolar current collector 420, the stack assembly 400 may be weld-free. Notably, the design and polarities may be reversed and the stack assembly may include other components, as previously discussed above.

The present disclosure thus contemplates methods for depositing a metal layer on another metal layer to form a bipolar film in certain variations. In one aspect, the method for depositing the metal layer may be electrochemical-deposition while in another aspect, the method for depositing the metal layer may be displacement deposition, as discussed above. The bipolar film structure obtained from such methods may be used as a current collector for lithium-ion batteries. In certain variations, such a bipolar current collector can be incorporated into a high-voltage lithium ion battery to form a serial connection design that has tab-free cells.

In other aspects, the bipolar film obtained from such processes may be used as a substrate for deposition or application of other materials to make composite films. In one aspect, a non-metal substrate, such as plastic film, is used to make a laminated film. In another aspect, a conductive non-metal substrate, such as graphene, is used to form a laminated film. Thus, the current thick copper films used for CVD production of graphene sheet can be replaced with use of the bipolar film structure in improved graphene sheet formation processes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a bimetallic current collector, the method comprising:
    depositing an electrically conductive metal on a surface comprising aluminum to form a continuous metal coating by an electroless displacement deposition process, wherein the electroless displacement deposition is carried out in a medium comprising a chelate, the surface comprising aluminum is pretreated by reacting the surface with a zincate, and the electrically conductive metal is selected from the group consisting of: copper, nickel, and combinations thereof, so as to form the bimetallic current collector having an average thickness of less than or equal to about 25 micrometers.

2. The method of claim 1, wherein the surface comprising aluminum is on a substrate selected from the group consisting of: plastic, graphene, aluminum foil, and combinations thereof.

3. The method of claim 1, wherein the surface comprising aluminum is an aluminum foil substrate.

4. The method of claim 1, wherein the chelate comprises a copper metal organic framework (Cu-MOF).

5. The method of claim 4, wherein the chelate is selected from the group consisting of: ammoniacal copper benzenetricarboxylate MOF (Cu-BTC) solution, ammoniacal NOTT-116 solution, ammoniacal copper NOTT-100 solution, ammoniacal copper MOF74 solution, and combinations thereof.

6. The method of claim 1, wherein the continuous metal coating is a copper coating having a thickness of greater than or equal to about 2 monolayers and less than or equal to about 1 micrometer.

7. The method of claim 1, further comprising depositing graphene over the continuous metal coating.

8. A method of forming a bipolar current collector for a battery, the method comprising:
    depositing a first conductive material selected from the group consisting of: copper, nickel, aluminum, graphene, alloys, and combinations thereof on a first portion of a first surface of a flexible substrate to form a first coating and depositing a second conductive material distinct from the first conductive material that is selected from the group consisting of: nickel, copper, graphene, alloys, and combinations thereof on a second portion of the first surface to form a second coating, wherein the flexible substrate comprises one or more polymeric materials selected from the group consisting of: polyester, polypropylene, polyimide, and combinations thereof and the first portion and the second portion are distinct regions of the first surface; and
    folding the flexible substrate so that the first portion of the first surface is exposed and defines a first side, a folded region, and the second portion of the first surface is exposed and defines a second side, wherein the first side defines a first current collector having a first polarity and the second side defines a second current collector having a second polarity opposite to the first polarity so as to form a bipolar current collector.

9. The method of claim 8, wherein the depositing the first conductive material and the depositing the second conductive material are independently selected from the group consisting of: electrolytic deposition, electroless displacement deposition, and combinations thereof to form a coating of the material having an average thickness of less than or equal to about 25 micrometers.

10. The method of claim 1, wherein the bimetallic current collector has an average thickness of less than or equal to about 20 micrometers.

11. A method of forming a bimetallic current collector, the method comprising:
    depositing an electrically conductive metal on a surface comprising aluminum to form a continuous metal coating by an electrolytic deposition process carried out in a liquid medium, wherein the electrically conductive metal is selected from the group consisting of: copper, nickel, and combinations thereof, and the liquid medium comprises water and either:
    (i) a copper-containing compound selected from the group consisting of: copper sulfates, copper chlorites, copper cyanide, copper tetraethylenepetamine, ammoniacal copper sulfate, copper pyrophosphate, ammoniacal copper chloride, ammoniacal copper benzenetricarboxylate MOF (Cu-BTC) solution, ammoniacal NOTT-116 solution, ammoniacal copper NOTT-100 solution, ammoniacal copper MOF74 solution, and combinations thereof, or
    (ii) a nickel-containing compound selected from the group consisting of: nickel sulfate, nickel chloride, nickel fluoroborate, and combinations thereof,
    wherein the copper-containing compound is present in the liquid medium at greater than or equal to about 40 to less than or equal to about 250 g/L or the nickel-containing compound is present in the liquid medium at greater than or equal to about 150 g/L to less than or equal to about 300 g/L and the electrolytic deposition is carried out at a current density of greater than or equal to about 0.005 A/cm$^2$ to less than or equal to about 0.5 A/cm$^2$ and a temperature of the liquid medium is greater than or equal to about 20° C. to less than or equal to about 60° C., so as to form the bimetallic current collector having an average thickness of less than or equal to about 10 micrometers.

\* \* \* \* \*